United States Patent

[11] 3,601,166

| [72] | Inventor | Walter J. Kohler, III<br>Kohler, Wis. |
|---|---|---|
| [21] | Appl. No. | 823,777 |
| [22] | Filed | May 12, 1969 |
| [45] | Patented | Aug. 24, 1971 |
| [73] | Assignee | Kohler General, Inc.<br>Sheboygan Falls, Wis. |

[54] WORK FEED SLAT CONVEYOR FOR A SAW
5 Claims, 7 Drawing Figs.

[52] U.S. Cl. .................................................... 143/49,
83/423, 144/245 A
[51] Int. Cl. ...................................................... B27b 25/04
[50] Field of Search ........................................... 143/49;
83/423; 144/245 A

[56] References Cited
UNITED STATES PATENTS

| 1,807,216 | 5/1931 | Johnson ...................... | 143/49 X |
|---|---|---|---|

FOREIGN PATENTS

| 534,041 | 9/1931 | Germany ...................... | 143/49 |
| 899,705 | 12/1953 | Germany ...................... | 143/49 |

Primary Examiner—Donald R. Schran
Attorney—Wheeler, Wheeler and House

ABSTRACT: Work is held normally level as advanced past a tool such as a saw, while the supporting slats (other than those carrying propelling dogs) are cammed down to a level below the teeth of the tool. Arrangement is made for bridging the normally depressed area under special circumstances.

INVENTOR
WALTER J. KOHLER, III

ATTORNEYS

INVENTOR
WALTER J. KOHLER, III

Wheeler, Wheeler, House & Clemency
ATTORNEYS 3,601,166

WORK FEED SLAT CONVEYOR FOR A SAW

BACKGROUND OF INVENTION

Conventional slat conveyors comprise two or more conveyor chains for the support of slats on which panels are propelled through a cutter area. For example, the cutters may comprise one or more circular saws which divide into strips a panel mounted on the slats.

In cutting through the work, the saw or saws may cut into the wooden slats on which the work is supported. The design must permit the slats to be replaced whenever the saw cuts are so numerous as to impair the slat serviceability.

SUMMARY OF INVENTION

To rigidify the conveyor bed slats, the slats are optionally mounted interchangeably on metal bars connecting the chains. Most conveyor chain pins are equipped with rollers and a track is provided which guides the rollers in a downward curve to pass beneath the cutters and spaced therefrom as the slats traverse the cutting area.

However, the dogs should continue at the work level in order that the stock will proceed straight through without damage. Accordingly, means is provided for guiding the dog-carrying slats and bars on a rectilinear path so the panels will be pushed positively and squarely. The cam-following rollers are omitted from pins of chain links carrying bars on which dogs are mounted and from the next pins ahead. Support for them is provided by shoes riding on tracks. To hold up the trailing end of a workpiece, the slat just ahead of the dog-bar is similarly supported. The slats just ahead of dog-bars are the only slats badly cut. The second slat ahead and the first slat behind a dog-bar have arcuate cuts in their trailing and leading edges respectively but other slats escape cutting. Thus the majority of slat damage is eliminated by the invention.

DESCRIPTION OF PREFERRED EMBODIMENT

Figure 1:
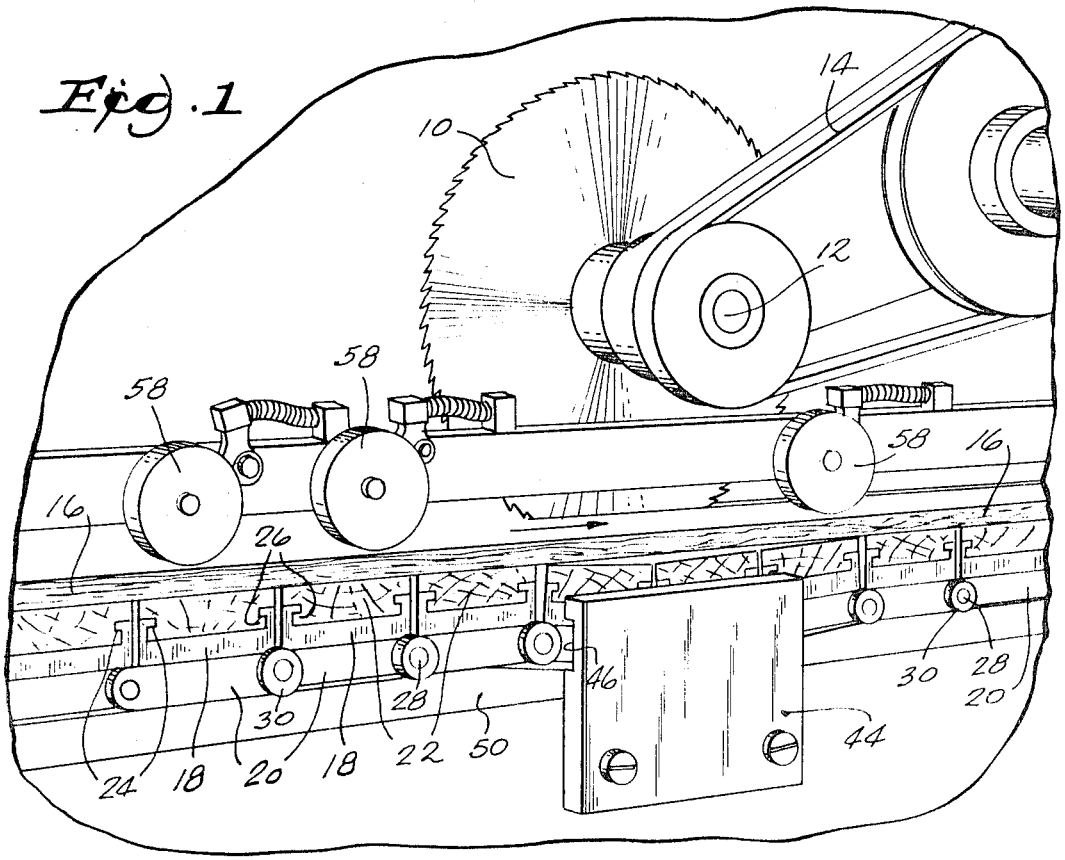
FIG. 1 is a fragmentary view in perspective showing the cutting area on one side of a woodworking machine (it being understood that this is representative of both sides).
Figure 2:
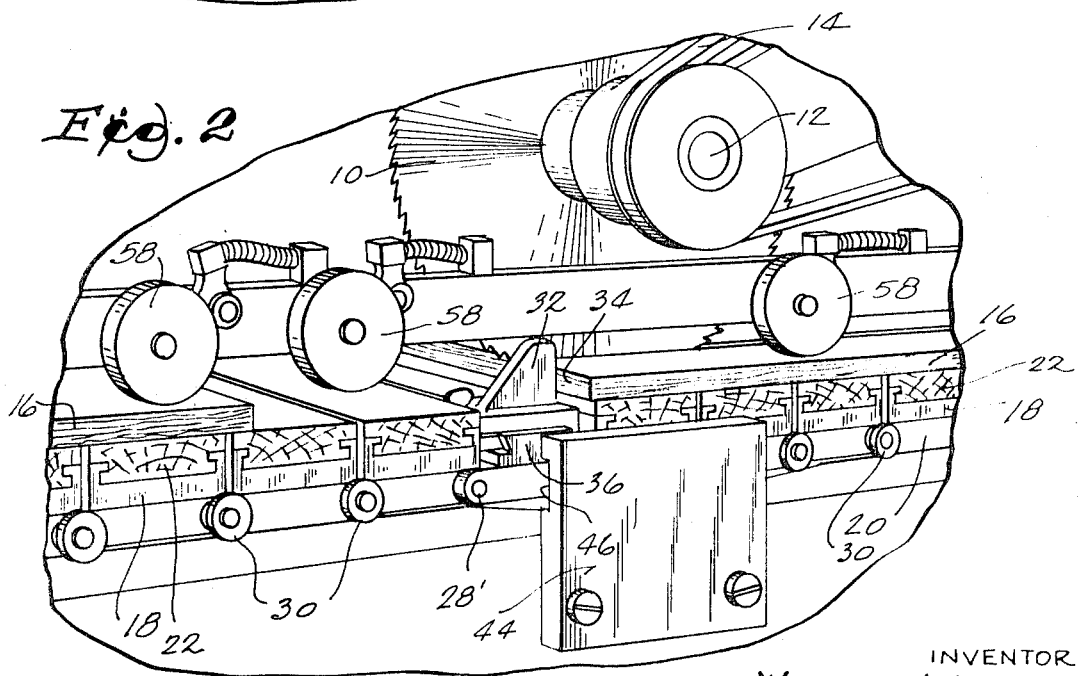
FIG. 2 is a fragmentary view similar to FIG. 1 showing the trailing end of a workpiece passing the cutting area of the machine.

To exemplify the invention, a saw 10 represents a cutting tool mounted on an arbor 12 driven by belt 14. FIGS. 1 and 2 show a workpiece 16 which may be a panel or a sash to be trimmed. Whatever workpiece is required to be cut by tool 10, is mounted on a bed which comprises slats 22 mounted on the links 20 of one or more conveyor chains and frequently arranged to be supported by bars 18. The slats 22 are usually made of wood and have kerfs at 24 to receive the flanges 26 with which the bars are provided. The slats may be replaced by simply sliding them endwise from the respective flanged bars 18.

Figure 3:
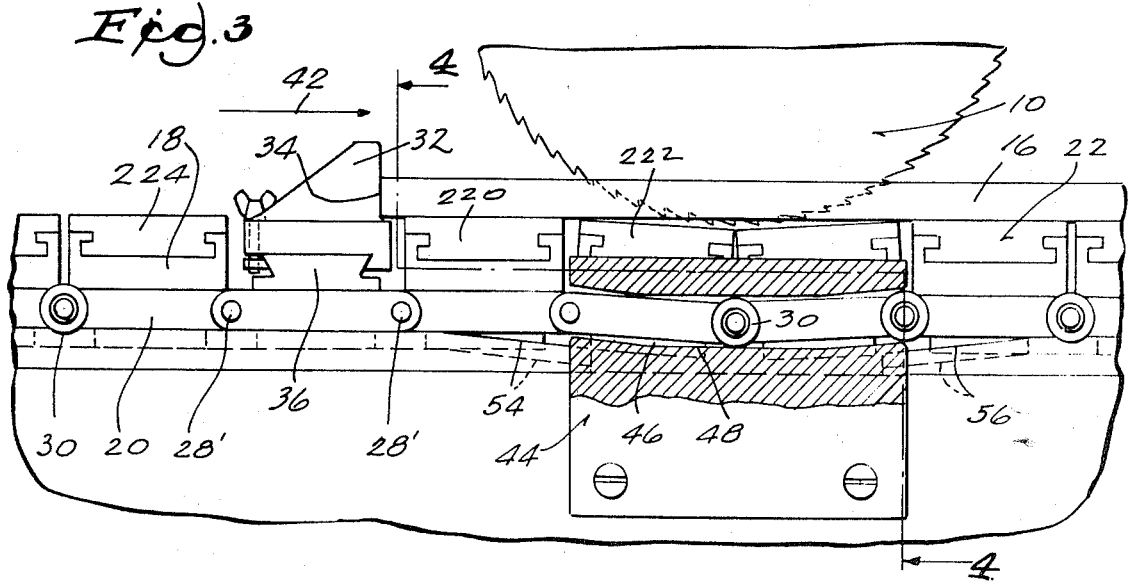
FIG. 3 is a fragmentary side elevational view of the same parts of the woodworking machine.
Figures 4, 5:
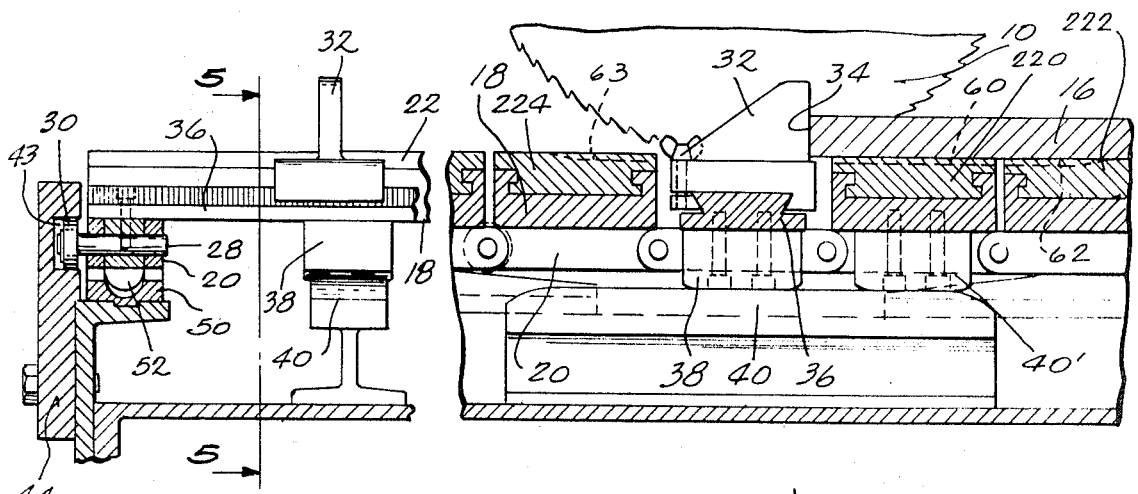
FIG. 4 is a sectional view taken on line 4—4 of FIG. 3.
FIG. 5 is a view taken in section on the line 5—5 of FIG. 4.

At all points other than the cutter area, the chains maintain the slats in the common plane illustrated in FIGS. 1 and 3, support being provided for the conveyor links 20 by channeled members 50 with which complementary under surface 52 of the links are engaged as shown in FIG. 4.

The respective conveyor chain links 20 are connected by the usual pins 28, a few of which end flush with the chain links as shown at 28' in FIG. 2 and most of which are extended to support cam follower rollers 30.

The individual workpieces 16 are propelled through the cutting zone by dogs 32 engaging the rear end portions 34 of the respective workpieces 16. The dogs 32 are mounted on a bar 36 on which there is no slat such as slats 22 with which the other bars are provided. It is important that the dog move rectilinearly through the cutting zone so that the thrust on the workpiece propelled thereby will be direct endwise thrust. To this end, each dog-carrying bar and that immediately preceding it has rail supports other than those provided for the rest of the conveyor. Accordingly, the dog-carrying bar 36 is provided beneath the dog with a shoe at 38 which rides on a rail 40 sufficiently long to provide support for rectilinear travel throughout the cutting area. A similar shoe at 40' rides on this rail to support the particular bar 18 which immediately precedes the bar 36. This supports the trailing end 34 of the workpiece which has just been cut by the saw (see FIG. 5). In FIG. 5 as in FIGS. 1, 2 and 3, the direction of movement is from left to right as shown by the arrow 42 in FIG. 3.

Figure 6:
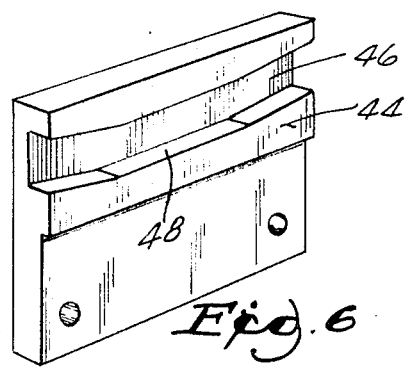
FIG. 6 is a perspective view of a stationary cam which deflects the slat-carrying conveyor links and slats as they traverse the cutting area.

In accordance with the present invention, a cam plate 44 is mounted on each side of the machine. This plate is provided with a cam slot at 46 which, as best shown in FIGS. 3 and 6, has a downwardly offset intermediate portion 48. Those links 20 which have extended pins 28 carrying cam follower rollers 30 will have their respective rollers engaged in the cam slots 46, 48 and deflected downwardly as clearly shown in FIGS. 1 and 3. The result is that slats 22 controlled thereby will be deflected successively as they pass beneath the woodworking tool 10. This permits the tool to extend completely through the work without cutting into the underlying slat 22. The work, meantime, will be propelled rectilinearly because it is receiving support by slats at both sides of the work area which are in a common plane. The supports 50 are discontinuous, having portions downwardly inclined as shown in dotted lines at 54 in FIG. 3, whereby individual cam follower rollers are lowered into registry with the respective slots 46 of the cam plate 44. As the rollers emerge from the cam plate, they are picked up by an upwardly inclined bearing surface at 56 and restored to the normal plane of operation.

To maintain the work horizontal notwithstanding the deviation of the supporting slats of the cam track and cam followers as above described, holddown rolls are preferably provided as indicated at 58 in FIGS. 1 and 2. These holddown rolls tend to hold the work in the original plane and in that respect they cooperate with the arrangement whereby the propelling dogs 32 are required to move continuously in that plane.

The holddown rolls alone would not suffice to maintain the work level and planiform in passage through the cutting zone were it not for the arrangement which permits the dogs to continue rectilinearly through that zone. If the dogs were mounted on conveyor links partaking of the tilting and deflection effected by the cam as above described, they would damage the trailing edge of the work by reason of the change of angle which would result and deform the trailing edge if the dog-carrying bar were to be tilted.

Figure 7:
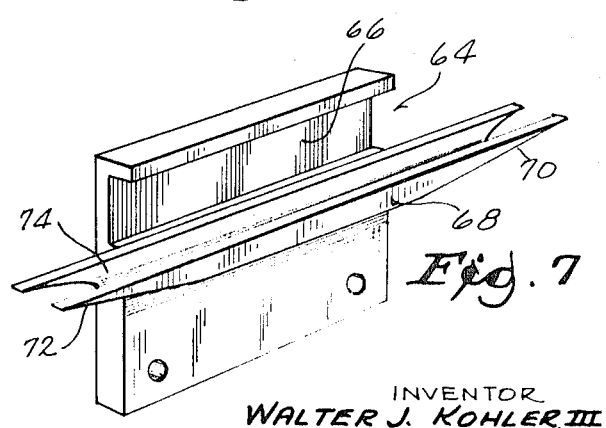
FIG. 7 shows a modified cam embodiment which is used when the stock is so thin that it might not be cut through if the slats forming the bed were deflected, as by the cam of FIG. 6.

Occasionally the workpiece is so thin or flexible that it cannot be maintained planiform in the cutting zone unless supported throughout its traverse of that zone. Under those circumstances, the cam plate 44 is removed and the cam plate 64 shown in FIG. 7 is substituted. This cam plate has a rectilinear slot at 66 for passing the cam follower rollers without deflection and it has a bridge member 68 which carries the supporting portions 52 of the respective chain links to prevent these from passing downwardly at 54 and upwardly at 56 as occurs when the cam plate 44 is used. The elongated inclined surface 70 of the bridge member 68 will rest on the inclined surface 54; the inclined end portion 72 of the bridge member will rest on surface 56. Thus the channel 74 of the bridge member will register with the above-described channel of the guide 50 (FIG. 4) to provide continuous rectilinear support for the chain links. Needless to say, this arrangement is not used except when necessary since it results in the cutting of all slats as they pass beneath the cutting tool.

When the preferred cam and cam follower arrangement contemplated by the invention are in use, the woodworking tool 10 will cut a kerf 60 in the particular slat 220 which immediately precedes the propelling dog 32 (FIG. 5) and it will also cut a kerf 62 of lesser extent in the second preceding slat 222. This is due to the fact that the second preceding slat will emerge from the depressed portion 48 of the cam sufficiently close to the saw so that the short kerf 62 will result. The slat 224 immediately following the dog 32 will also receive a kerf 63 of lesser extent. All the other slats will tend to remain substantially undamaged.

I claim:

1. A power tool having a work cutter and a conveyor provided with a bed adapted for supporting work and for feeding work past the cutter, said conveyor including means for deflecting portions of the work-supporting bed as they pass beneath the cutter to avoid their being cut thereby, said work-feeding means including dog means on the conveyor for exerting rectilinear propelling force on a workpiece for advancing it beneath the cutter, and means for effecting substantially rectilinear movement of the dog means during operation of said means for deflecting away from the cutter those portions of the conveyor bed which are ahead of and behind the dog.

2. A power tool according to claim 1 in which the conveyor comprises links, slats replaceably mounted on the links and constituting the said work-supporting bed, cam follower rollers projecting from the conveyor links upon which slats are supported, work-propelling dogs having means carrying them from other links, cam means for engaging said cam followers and constituting said means for deflecting portions of said bed upon a path offset from said cutter, and means for supporting dog-carrying links against deflection, whereby the dogs move substantially rectilinearly past said cutter.

3. A power tool according to claim 2, which includes conveyor track means having portions spaced at opposite sides of the cam means, the conveyor links having portions resting on and guided by said track means except in the vicinity of the cam, the said cam followers being adapted to engage the cam means when their respective links leave said track means.

4. A power tool according to claim 2 in further combination with rotatably mounted holddown devices positioned for work engagement both in front of and behind said cutter.

5. A machine having a cutting zone in which there is a cutting tool, and a conveyor provided with a bed adapted for feeding work to the cutting tool, said conveyor comprising pivotally connected links, discontinuous track means with which said links are engaged for support to maintain said bed level, the said track means including sections spaced to provide ends before and after said tool, a cam opposite said tool, certain links having cam followers engageable with said cam opposite said tool, said cam being provided with a track for said followers and having link-deflecting surfaces adapted to depress links provided with said followers, bars connected with said links and extending transversely of the bed, the bars connected with links having said followers being adapted to be lowered to pass beneath said tool, said bed comprising slats detachably connected with said bars and adapted to be lowered therewith out of contact with said tool, other links interposed between said certain links and being without cam followers, bars and work-propelling dogs carried on said other links for pushing work through the cutting zone in which said tool operates, a rail extending through said zone, and shoe means on said other link and supported on said rail for causing dog-carrying bars substantially rectilinearly through said zone.